Patented Feb. 24, 1953

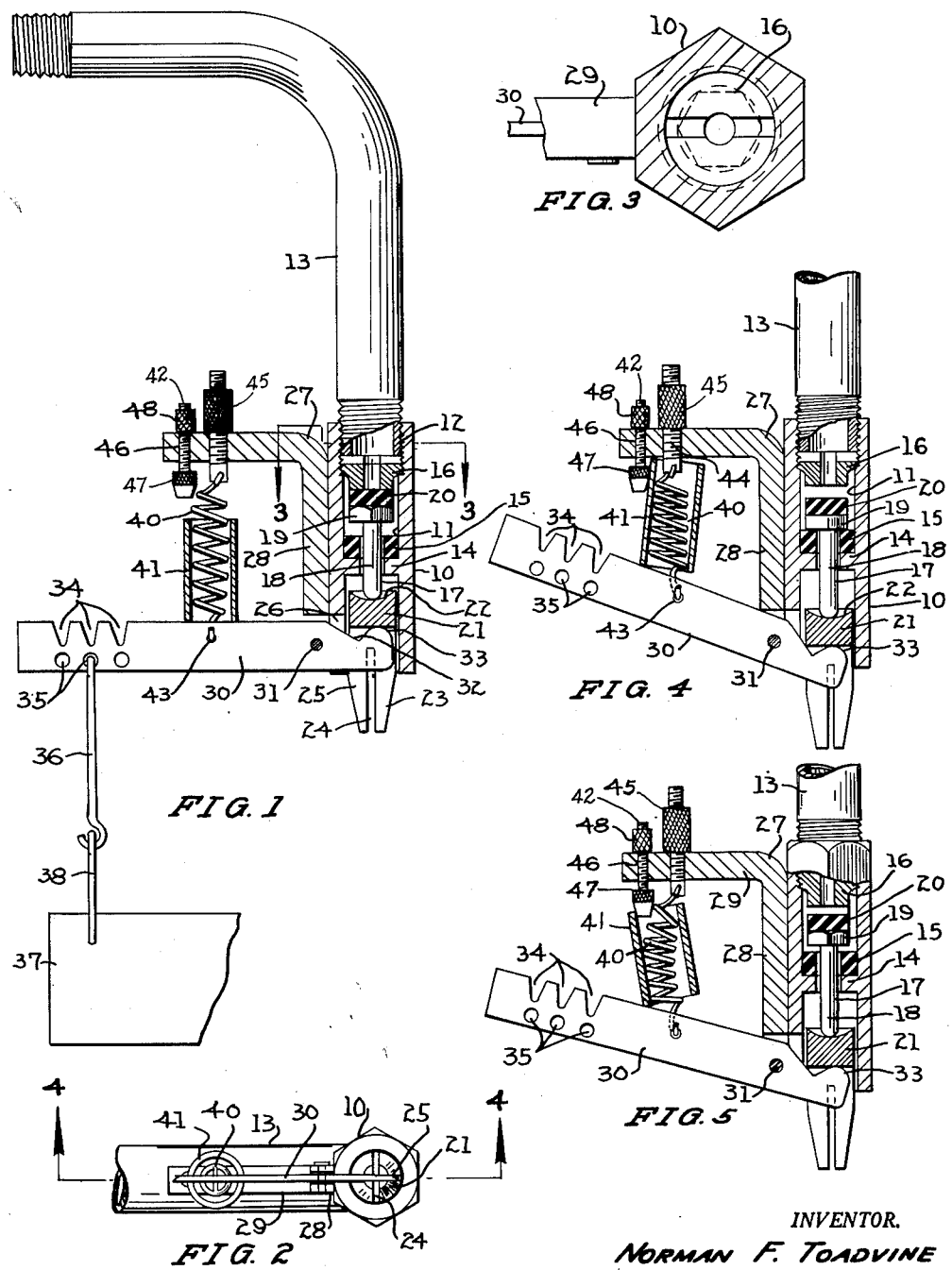

2,629,581

UNITED STATES PATENT OFFICE 2,629,581

AUTOMATIC WATER VALVE

Norman F. Toadvine, Salisbury, Md.

Application October 20, 1950, Serial No. 191,131

2 Claims. (Cl. 251—164)

This invention relates to automatic water valves for poultry waterers and similar devices and is a continuation in part of my application Serial No. 147,403, filed March 3, 1950, for Automatic Water Valve.

It is among the objects of the present invention to provide an improved automatic water valve from which a watering pan or trough can be suspended and which will automatically close when the trough is full to prevent overflow and when the trough or pan is entirely empty or detached to prevent flooding the area, and which will automatically open only when the trough is partly full and attached to the valve, which includes manually settable means for temporarily holding the valve open when the trough is empty to fill the trough, such means being spring actuated to return the valve to automatic operation when the trough has been filled, which regulates the flow of water to the trough and pan and prevents splashing and spraying, which is adjustable to control the rate of flow of water therethrough while the valve is held open by the manually settable means, and which is simple and durable in construction, economical to manufacture, easy to install, and positive and effective in operation.

Other objects and advantages will become apparent from a consideration of the following description and the appended claims in conjunction with the accompanying drawing wherein:

Figure 1 is a side elevational view of an automatic water valve illustrative of the invention, parts being broken away and shown in cross section to better illustrate the construction thereof;

Figure 2 is a bottom plan view of the valve illustrated in Fig. 1;

Figure 3 is a transverse cross sectional view on the line 3—3 of Figure 1;

Fig. 4 is a fragmentary cross sectional view on the line 4—4 of Figure 2 showing the parts in a different operative position from that illustrated in Figure 1; and Figure 5 is a cross sectional view similar to Figure 4 but showing the parts in an operative position different from that illustrated in Figures 1 and 4.

With continued reference to the drawing, the valve comprises an elongated tubular housing 10 having a cylindrical bore 11 extending longitudinally therethrough and provided at one end of the housing with internal screw threads 12. An elbow fitting 13 having externally screw threaded end portions is threaded at one end into the screw threaded end of the housing 10 and is adapted to be connected at its other end to a water supply conduit so that the valve will be dependingly supported from the conduit.

Intermediate its length the housing is provided with an internal annular rib or collar 14 surrounding a central aperture and a centrally apertured washer or gasket 15 rests upon the side of this collar adjacent the screw threaded end of the housing.

A centrally apertured screw plug 16 is threaded into the screw threaded end of the housing 10 and the end of this plug adjacent the collar 14 constitutes a valve seat. A valve plunger 17 has an elongated stem 18 which extends through the registering apertures in the washer 15 and the collar 14 and a head 19 on one end of the stem and disposed between the washer 15 and the screw plug 16. A gasket 20 of resilient material is disposed between the head 19 and the screw plug 16 and cooperates with the adjacent end of the screw plug to close the valve in one direction. The head 19 cooperates with the adjacent surface of the washer 15 to close the valve in the other direction.

The plunger head 19 and gasket 20 are smaller than the bore 11 and sufficient space is provided circumferentially between these elements and the inner wall of the housing to permit the flow of water past the gasket 20 and head 19 when the valve is open, and the stem 18 is smaller than the apertures in the washer 15 and collar 14 by an amount sufficient to provide a space for the flow of water through these apertures past the stem when the valve is open.

An abutment block or bolt 21 is slidably mounted in the end of the housing bore 11 remote from the screw threads 12 and is smaller than the bore by an amount sufficient to provide a water flow space between this block and the inner surface of the housing. At one end the block is provided with a concave recess 22 which receives the adjacent end of the stem 18 and provides a deflector for a stream of water flowing along the stem, reducing the velocity of this stream of water so that the water will flow slowly and uniformly through the space between the block and the inner surface of the housing wall and will not spray out of the housing past the block. At its other end the block is tapered, as indicated at 23, and is provided with elongated notches 24 and 25 disposed at right angles to each other, the notch 25 being deeper than the notch 24 as is clearly illustrated in Figure 1.

At its end receiving the block 21 the housing 10 is provided with a longitudinally extending notch 26 and an angle member 27 has one leg 28 extending along the side of the housing 10 and terminating at one end near the end of the housing in which the block 21 is received, the other end of this leg terminating near the internally screw threaded end of the housing. The leg 28 is provided in its end at the block receiving end of the housing with a notch registering with the notch 26 in the housing and the other leg 29 of the angle member extends perpendicularly from the leg 28 at the end of the latter adjacent the screw threaded end of the housing and constitutes a spring supporting arm later to be described in detail.

A lever 30 extends through the notches in the bracket leg 28 and in the housing 10 and is pivotally connected at one end to the bracket leg 28 by a pivot pin 31 extending through registering apertures in the notched portion of the bracket leg and in the lever. One end of the lever 30 extends into the housing 10 and is received in the notch 25 in the block 21. The edge of the lever adjacent the closed end of the notch 25 is recessed, as indicated at 32, to provide on the end of the lever a rounded abutment 33 which bears against the bottom of the notch 25 to move the block 21 inwardly of the housing when a predetermined force, later to be described, is applied to the lever at the opposite side of the pivot pin 31.

Near its other end the lever 30 is provided with a series of notches 34 and with a series of corresponding apertures 35 and a suitable hook 36 is secured to the lever by extending through a selected one of the notches 34 or the apertures 35 and depends from the lever. A poultry watering trough 37 has one end disposed below the hook 36 and connected to the lower end of the latter by a bail 38 so that the weight of the watering trough and any water therein pulls downwardly on the end of the lever 30 to which the hook 36 is connected. A downward pull on this end of the lever forces the block 21 inwardly of the housing 10 and moves the plunger 17 in a direction to compress the gasket 20 between the head 19 of the plunger and the adjacent end of the screw plug 16 to thereby close the valve. A coiled tension spring 40 is connected between the lever 30 and the arm 29 near the outer end of the arm to resiliently move the lever in the opposite direction, permitting the block 21 to move outwardly of the housing and the plunger head 19 to contact the adjacent surface of the resilient washer 15 to thereby close the valve in the opposite direction.

The valve will thus close when the watering pan is full to prevent overflowing the pan or trough and will also close under the influence of the spring 40 when the pan is empty or detached to prevent flooding of the watering area. The valve is open only when the plunger head 19 and associated gasket 20 are out of contact with both the washer 15 and the screw plug 16. This will occur when the weight of the trough 37 and the water therein just balances the force of the spring 40 so that the spring will slightly raise the lever 30 to open the valve. As soon as sufficient water has passed through the valve and into the trough to overcome the force of the spring, the lever will be pulled down and will again close the valve.

After the water has passed the cup recess 22 in the inner end of the block 21 it will flow through the space between the block and the housing wall and along the block to the tapered end of the latter, flowing inwardly of the notches 24 and 25 as it flows downwardly along the block. This shape of the block produces a solid stream of water flowing at low velocity from the lower, smaller end of the block which stream will fall directly into the trough 37 and will not splash. The block 21 thus prevents the stream of water issuing from the valve from spraying or splashing outside of the water receiving trough.

When the trough 37 is empty or detached from the lever 30 the spring 40 will pull the lever toward the bracket arm 29 permitting the plunger head 10 to contact the adjacent surface of the gasket 20 and close the valve. After the troughs have been cleaned they are reconnected to the corresponding valves in an empty condition. The valve will then be closed and will not permit a flow of water to the pan to refill the pan unless the lever 30 is held by some other means in its valve opening position. Manually settable means are provided for this purpose and includes a tubular member 41 surrounding the spring 40 and an adjustable stop 42 carried by the bracket arm 29 near the outer end of the latter for contact by the member 41.

The spring 40 has on one end a loop received in an aperture 43 in the lever 30 intermediate the length of the latter and has on its other end a loop received in an eye provided on one end of a threaded stem 44 which extends through an aperture in the arm 29. A nut 45 is threaded on the stem 44 at the side of the arm 29 remote from the spring to vary the force exerted by the spring on the lever 30.

The stop 42 comprises a screw threaded stem 46 threaded through an aperture in the arm 29 adjacent the stem 44 and provided on its end adjacent the lever 30 with a peripherally knurled head having a frustro-conical lower end 47. A lock nut 48 is threaded onto the stem 46 at the side of the arm 29 remote from the head 47.

In order to manually set the valve to open position to maintain a continuous flow of water therethrough to fill the trough 37, the lever 30 is depressed by hand against the tension of the spring 40 until the upper edge of the tubular member 41 can clear the lower end of the head 47 of the stop 42. The tubular member 41 is then canted or tilted outwardly from the top to the position shown in Fig. 5. The engaged portion of the upper edge of the tubular member then can ride up over the conical lower end of the head 47 and the opposite lower edge is engaged by the lever 30. The longitudinal expansion of the spring 40 on the lever 30 will lock the tubular member in this position and the manual canting or tilting of the tubular element will distort the spring 40 so as to place the tubular member under lateral spring tension in this position. The stem 44 and stop 42 on the arm are so positioned that this canting or tilting of the tubular member is easily accomplished.

With the parts positioned as shown in Fig. 5, when the volume of water in the trough 37 reaches a point where its weight will depress the lever 30 against the set longitudinal tension of the spring 40 the lateral tension of the spring due to its distortion will snap the tubular member laterally out of set position. This release is facilitated by the tilted position of the tubular member and its upper edge engagement with the cone shaped end of the head 47 of the stop 42. Further depression of the lever 30 will close the valve as shown in Fig. 1. However, the tubular member 41 being snapped out of its set position will not further interfere with the automatic operation. Water will now continue to flow into the trough until the weight of the trough is sufficient to move the lever 30 downwardly against the force of spring 40 closing the valve by bringing the gasket 20 against the screw plug 16. When water is used from the trough the spring will raise the lever to open the valve and provide a flow of water to the trough to replenish the supply therein. If the trough is accidentally upset, the spring will raise the lever 30 sufficiently for the plunger head 19 to contact the resilient washer 15 and close the valve in that direction.

The adjustable stop 42 provides a means for controlling the time of flow of water through the valve while the valve is held open by engagement of the tubular member 41 with the stop. The stop is adjusted by first loosening the lock nut 48, then turning the stem 46 by the knurled head 47 until the proper adjustment has been obtained and then tightening the lock nut to hold the stop in adjusted position.

By providing spring operation of the member 41 a positive release of the manually settable means to restore the valve to automatic operation is obtained at all times. It frequently happens that water will be spilled on the manually settable means for holding the valve open and, in cold weather this water will freeze and tend to hold the means in valve opening position even after the trough 37 has been filled. If this happens the valve would not close and water would flow through the valve and flood the area around the trough. As the valves are used in poultry houses where there is a considerable amount of dirt thrown into the air by the movement of the fowl, it also frequently happens that a piece of dirt will become lodged in the manually settable means holding it against release where gravity alone resets the automatic operation with the undesirable result described above. With the improved valve of the present invention the spring force is sufficient to release the manually settable means even though such release be resisted by ice or dirt and the valve will be positively restored to automatic operation as soon as the weight of water in the trough 37 overcomes the force of the spring 40.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In an automatic water valve including an elongated tubular housing, a conduit fitting connected to one end of said housing, a double acting valve in said housing, a lever pivotally connected near one end to said housing and engaging said valve to close said valve in one direction when subjected to a predetermined force, an arm projecting from said housing in the same direction as said lever and spaced from the latter, and a spring connected between said arm and said lever resiliently engaging said lever in a direction to permit said valve to close in the opposite direction, a manually settable element interposed between said lever and said arm, said element being so related to said spring that said spring is distorted by said element when said element is set between said lever and said arm to releasably hold said lever in valve opening position against the force of said spring, said element being moved by said spring to free the lever for automatic operation of the valve when the predetermined force on said lever exceeds the spring force exerted thereon.

2. In an automatic water valve including a tubular valve housing, a double acting valve in said housing, a lever pivotally mounted near one end on said housing at one end of the latter and operatively connected to said valve to move the latter in one direction to closed position, a bracket secured to said housing and providing an outwardly projecting arm spaced from said lever, a tension spring connected between said lever and said arm for moving said lever to free said valve to close in the opposite direction, an adjustable stop carried by said arm adjacent said spring, and a tubular member surrounding said spring between said lever and said arm and manually movable into engagement with said stop to hold said lever in position to maintain said valve open, said member distorting said spring when brought into engagement with said stop and being moved by said spring away from said stop when said lever is moved away from said arm against the force of said spring.

NORMAN F. TOADVINE.

REFERENCES CITED

The following references are of record in the file of this patent:

UNITED STATES PATENTS

| Number | Name | Date |
|---|---|---|
| 1,327,999 | Hill | Jan. 13, 1920 |
| 1,530,668 | Harter | Mar. 24, 1925 |
| 1,653,525 | White | Dec. 20, 1927 |
| 2,496,046 | Gilbough | Jan. 31, 1950 |
| 2,512,839 | Pruitt | June 27, 1950 |
| 2,541,622 | Toadvine | Feb. 13, 1951 |